(12) United States Patent
Hall et al.

(10) Patent No.: US 12,112,647 B2
(45) Date of Patent: Oct. 8, 2024

(54) METHODS AND DEVICES FOR UNMANNED AERIAL VEHICLE BASED SITE INSPECTION AND SCALE RENDERED ANALYSIS

(71) Applicant: Halkin Inc., Denver, CO (US)

(72) Inventors: Ryan Hall, Denver, CO (US); Grant Hall, Denver, CO (US)

(73) Assignee: Halkin Inc., Denver, CO (US)

(*) Notice: Subject to any disclaimer, the term of this patent is extended or adjusted under 35 U.S.C. 154(b) by 0 days.

(21) Appl. No.: 18/331,284

(22) Filed: Jun. 8, 2023

(65) Prior Publication Data

US 2024/0112586 A1    Apr. 4, 2024

Related U.S. Application Data

(63) Continuation of application No. 16/941,962, filed on Jul. 29, 2020, now Pat. No. 11,710,415.
(Continued)

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *G06Q 10/06311* (2013.01);
(Continued)

(58) Field of Classification Search
CPC ........ G08G 5/0069; G08G 5/003; G08G 5/00; B64C 39/024; B64C 39/02;
(Continued)

(56) References Cited

U.S. PATENT DOCUMENTS 9,734,723 B1    8/2017  Bruno et al.
10,186,049 B1 *  1/2019  Boardman ................ G06T 7/55
(Continued)

FOREIGN PATENT DOCUMENTS

EP          3767949 A1      1/2021
WO   WO-2017019595 A1 *   2/2017   ........... B64C 39/024
(Continued)

*Primary Examiner* — Yonel Beaulieu

(57) ABSTRACT

Various embodiments of the present technology generally relate to unmanned aerial vehicle (UAV) scale rendered analysis, orthomosaic, and 3D mapping and landing platform systems. More specifically, some embodiments relate to systems, methods, and means for the collection and processing of images captured during a UAV flight sequence. In some embodiments, the UAV landing platform retrieves flight information and initial map information over a unidirectional virtual private network from a multitenant cloud-based scheduling application. The UAV landing platform sends the initial map information to a UAV over a WiFi, Bluetooth, or radio frequency network and initiates a drone flight sequence once the drone flight sequence has been approved by a local user. The UAV landing platform receives property image data from a UAV after a UAV flight sequence has ended and transmits the received property image data back to the cloud application.

20 Claims, 15 Drawing Sheets

Related U.S. Application Data

(60) Provisional application No. 62/881,664, filed on Aug. 1, 2019.

(51) Int. Cl.
*G06Q 10/06* (2023.01)
*G06Q 10/0631* (2023.01)
*G06T 7/00* (2017.01)
*H04L 67/00* (2022.01)
*H04L 67/125* (2022.01)

(52) U.S. Cl.
CPC ........... *G06T 7/0004* (2013.01); *G08G 5/003* (2013.01); *H04L 67/125* (2013.01); *G06T 2207/10032* (2013.01); *G06T 2207/30164* (2013.01); *G06T 2207/30168* (2013.01)

(58) Field of Classification Search
CPC .............. G06Q 10/06311; G06Q 10/06; G06T 7/0004; G06T 2207/10032; G06T 2207/30164; G06T 2207/30168; H04L 67/125

See application file for complete search history.

(56) References Cited

U.S. PATENT DOCUMENTS

| | | |
|---|---|---|
| 2015/0022656 A1 | 1/2015 | Carr et al. |
| 2017/0235316 A1* | 8/2017 | Shattil .................. B64C 39/024 |
| | | 701/3 |
| 2018/0357909 A1 | 12/2018 | Eyhorn |
| 2020/0364930 A1* | 11/2020 | Buys ...................... G06V 20/17 |
| 2021/0049918 A1* | 2/2021 | Loveland ............... H04N 7/183 |
| 2023/0418287 A1* | 12/2023 | Cristache ............... B25J 9/1664 |

FOREIGN PATENT DOCUMENTS

| | | | | |
|---|---|---|---|---|
| WO | WO-2019169434 A1 * | 9/2019 | .......... | A01C 21/007 |
| WO | 2021216637 A1 | 10/2021 | | |

* cited by examiner

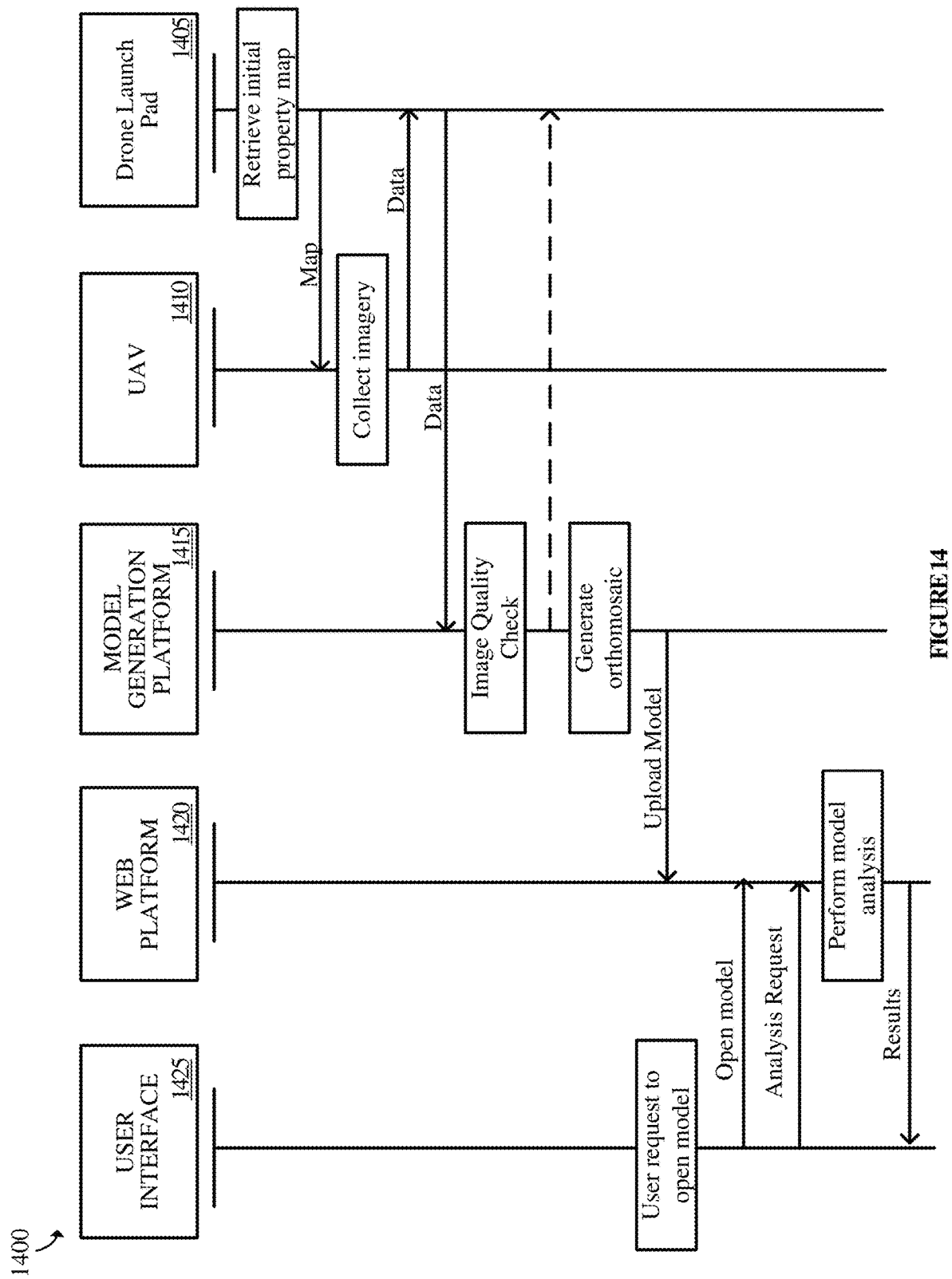

METHODS AND DEVICES FOR UNMANNED AERIAL VEHICLE BASED SITE INSPECTION AND SCALE RENDERED ANALYSIS

CROSS-REFERENCE TO RELATED APPLICATIONS

The present application claims priority to and benefit of U.S. patent application-Ser. No. 16/941,962, filed Jul. 29, 2020, now U.S. Patent No. 11,710,415 B2, which claims priority to and benefit of U.S. Provisional Application No. 62/881,664 filed Aug. 1, 2019, both applications entitled "Methods and Devices for Unmanned Aerial Vehicle Based Site Inspection and Scale Rendered Analysis." Both applications are incorporated herein by reference in their entirety for all purposes.

TECHNICAL FIELD

Various embodiments of the present technology generally relate to site inspections. More specifically, some embodiments relate to system, methods, and devices for unmanned aerial vehicle based site inspections, scale rendered analysis and agricultural analysis.

BACKGROUND

Traditional inspection and scale rendered analysis of building, construction sites, agricultural plots and the like often require inspection and evaluation of hard-to-access areas that are risky and complex to inspect. For example, a piece of equipment may be placed on a rooftop or a location where the atmosphere is hazardous. Unmanned aerial vehicles (UAVs) may provide superior imagery in many industrial, commercial and agricultural locations compared to traditional imaging methods. In some situations, it may be difficult, dangerous, or inefficient to send a manned camera mission to collect images necessary for routine inspection, analysis and documentation. Traditional survey methods are known to be slow and expensive, thereby inhibiting timely and extensive inspection and analysis. This can be problematic in buildings, industrial complexes, agricultural operations and infrastructure that require regular assessment. In these scenarios, UAVs provide a much more efficient, cost effective, and thorough analysis to help guide construction, maintenance, building analysis and repair. Furthermore, in cases of emergency or damage, it can be extremely problematic to wait days or weeks to assess the full scope of an issue as the location will be prone to weather that may cause further damage, and operations may be required to cease throughout the lifetime of evaluation and repair, further increasing the total cost.

Because UAVs are hardly limited in the imaging equipment they could potentially carry, their applications are expansive. Home and building inspections are just the start of UAV inspection capabilities. Aerial imaging of properties, natural resources, landscapes, and building exteriors and interiors are all viable options for UAV inspection and scale rendered analysis in addition to inventory analysis, security, preventative maintenance, Global Navigation Satellite Systems (GNSS) and Global Position Systems (GPS), Light Detection and Ranging (LiDAR), Infrared, gas detection and the like. UAV imaging can be useful in building maintenance, industrial settings, transportation assets, renewable energy, oil and gas, insurance adjustment and assessment, and many other settings.

As aerial imaging possibilities continue to grow, so does the long-felt need for an integrated analysis system capable of handling the many data types and vast amount of data collected with UAVs. The present disclosure covers embodiments relevant to processing and integrating many different imaging sources and types to construct three-dimensional (3D) image-based, scale rendered models of structures and landscapes.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer readable media for performing unmanned aerial vehicle (UAV) site inspection and scale rendered analysis. In some embodiments, a device has one or more computer-readable storage media and program instructions stored on the one or more computer-readable storage media that, when executed by a processing system, direct the processing system to retrieve an initial property map from a cloud-based scheduling platform that stores flight job information. The processing system then transmits the initial property map from the UAV landing platform to the UAV and retrieves a flight request from the cloud-based scheduling platform. Upon retrieving the flight request, the processing system directs the device to transmit the flight request to a device operated by a local user, where the device is configured to receive property image data from the UAV. The property image data includes images collected during a UAV flight sequence in which a property associated with the initial property map is inspected. The property image data is then uploaded to the cloud-based scheduling platform for image quality evaluation.

Upon receiving the flight request, the device operated by the local user initiates the UAV flight sequence. During flight, the UAV collects property image data that may include various combinations of landscape image data, thermal image data, wall image data, roof image data, industrial structure data, global positioning system data, and the like. The device further includes program instructions that direct the processing system to initiate a re-fly request upon receiving a determination from the cloud-based scheduling platform that a quality of the property image data is low. The initial property map sent to the device may include details such as structures, landscapes, or other features of the property.

The program instructions of the device may also direct the processing system to perform a function analysis on the UAV. During the function analysis, the UAV landing platform verifies UAV flight capability. Additionally, the program instructions of the device direct the processing system to, in the UAV landing platform, register at least one tenant user. Registering the at least one tenant user, in some embodiments, includes assigning a tenant token to each of the at least one tenant users. When the device retrieves a flight request, the flight request is transmitted by the UAV landing platform to the cloud-based scheduling platform over a unidirectional virtual private network. In certain embodiments, the cloud-based scheduling platform includes a multitenant cloud application.

Further embodiments relate to a method of operating a UAV landing platform. First, the UAV landing platform retrieves an initial property map from a cloud-based scheduling platform where the cloud-based scheduling platform is configured to store flight job information. Upon retrieving the initial property map, the UAV landing platform transmits the initial property map from the UAV landing platform to a UAV or drone. In some embodiments, the transmission may be carried out using WiFi, Bluetooth or radio frequency. The UAV landing platform then retrieves a flight request from the cloud-based scheduling platform and transmits this flight request to a device operated by a local user on which the UAV flight request may be initiated. The device operated by a local user includes a mobile application to communicate with the UAV landing platform in some embodiments. Following a UAV flight sequence, the UAV landing platform receives property image data from the UAV, where the property image data includes images collected during the UAV flight sequence over a property associated with the initial property map. Upon receiving the property image data from the UAV, the UAV landing platform uploads the property image data to the cloud-based scheduling platform for image quality evaluation.

In another embodiment, one or more computer-readable storage media contain program instructions to facilitate cloud-based unmanned aerial vehicle (UAV) job scheduling and image analysis. The program instructions, when executed by a computing system, direct the computing system to receive a request for a property map from a UAV launch pad. The property map may include information related to a site to be imaged. In response to the request for the property map, the program instructions direct the computing system to transmit the property map to the UAV launch pad. Additionally, the program instructions direct the computing system to receive an initial request for a flight plan from the UAV launch pad and, in response to the request for the flight plan, transmit the flight plan to the UAV launch pad. The flight plan sent to the UAV launch pad may be associated with the property map. Upon the completion of a UAV flight, the computing system receives a plurality of images from the UAV launch pad. The plurality of images may include site data collected during the UAV flight. The program instructions then direct the computing system to evaluate a quality of the plurality of images received from the UAV launch pad and, following the evaluation, respond to the UAV launch pad with information related to the quality of the plurality of images. The quality of the plurality of images may be determined to be of adequate quality or may be determined to be of poor quality.

The program instructions stored on the one or more computer readable media to facilitate cloud-based UAV job scheduling and image analysis may be configured to operate on a cloud based multi-tenant application. The UAV launch pad may also initiate a re-fly request upon determining that the quality of the plurality of images is low. The program instructions may further direct the processing system to perform image analysis on the plurality of images. The plurality of images may include one or more of landscape image data, industrial structure data, thermal image data, wall image data, roof image data, or global positioning system data.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIG. 14 illustrates a sequence diagram of data flow between various components of a UAV-based modeling system in accordance with some embodiments of the present technology.

Figure 1:
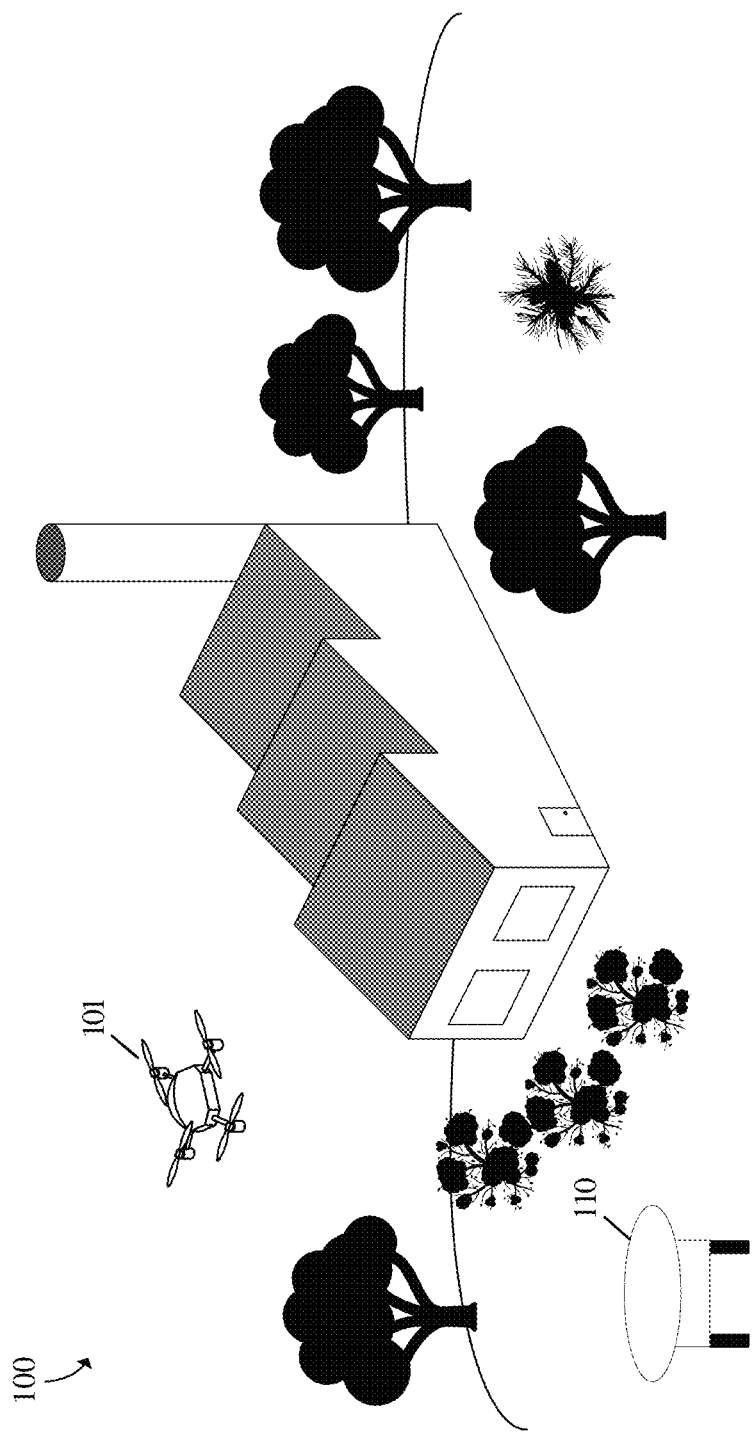
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems, methods, and computer-readable media for unmanned aerial vehicle (UAV) inspection analysis and scale rendering analysis. More specifically, some embodiments relate to software for the generation and analysis of models produced from UAV orthoimages. UAV technology can be used to map large areas and display detailed images. The ability to cover large areas quickly and get up-close images makes UAVs a superior alternative to traditional imaging and photographing, especially in places that may be undesirable, unsafe, or difficult to access in person. UAVs can be implemented in professional industrial environments to help reduce costs, save time, and gather important data related to decision-making, safety, or other operations. In some scenarios, businesses, homes, or other environments may need a snapshot of a current situation or area, especially for routine maintenance and repairs. At other times, UAV users may require full-time or on-demand monitoring and data collection for operators and managers to make informed decisions in real time. The present invention anticipates UAV imaging for basic photo and video in addition to complex three-dimensional (3D) mapping, visual detailing, scale rendering, and infrared inspection.

UAV inspection can provide accurate views allowing the identification of defects and scheduling of maintenance before something fails and costly repairs are necessary. UAV mapping may be useful in a variety of situations and locations including but not limited to manufacturing facilities, bridges, railroads, warehouses, airports, agriculture, cold storage, data centers, foundries, food processing facilities, beverage processing and bottling facilities, water and wastewater treatment facilities, commercial and residential buildings and the like. Examples of problems that can be detected with UAV imaging technology include but are not limited to excessive moisture, missing parts, deterioration, leaks, structural defects, overheated electrical equipment, corrosion and rust, missing or broken welds, cracked or degraded critical material, warping, heat stress, faulty mechanical equipment, excessive heat or cold leaks, and insulation defects.

Various embodiments of the present technology provide a mechanism of 3D mapping and site analysis. Some embodiments are capable of showing detailed terrain, elevation, and geologic features surrounding assets. The platform can provide customizable, scale-rendered 3D models annotated with inspection results and property management functions. In some embodiments, imaging data may be collected via preprogrammed, automated UAV flights that capture ultra-high-resolution images of a facility or asset. Images can be overlapped within the platform to generate the scale-rendered, 3D orthomosaic map in addition to 3D textured models, computer-aided design models and file formats, and other images that may be overlaid for a more complete model.

Some embodiments provide a unique operation and functionality of a UAV landing platform. In accordance with some embodiments, a UAV landing platform is a device that facilitates the imaging of structures and landscapes by a UAV and the processing of the collected images. After collection, the images can be constructed into a model that an end user can access. The UAV landing platform includes a landing pad for a UAV or drone to land on, take off from, and rest on when not in use. The UAV landing platform further includes, in some examples, a radio and network, a central processing unit (CPU), a storage system, an image handler, a job scheduler, and a phone home. The network and radio allow the UAV landing platform to communicate with outside networks and to maintain communication with the UAV during flight. The CPU and storage system facilitate computational operations that the UAV landing platform can perform. The image handler of the UAV landing platform processes property images received from a UAV. The job scheduler and the phone home communicate with outside networks and applications to retrieve flight plans, initial maps, and/or flight permissions.

The UAV landing platform is coupled with a cloud network, a UAV, and a mobile application. The UAV landing platform communicates with the UAV and may use WiFi, Bluetooth, radio frequency, or any other wireless communication medium to facilitate communication. The UAV landing platform may send and retrieve location or flight information, or any other information over the wireless connection. The UAV landing pad communicates with a mobile application by means of a two-way API and may utilize the connection to gain permission to initiate a drone flight sequence. The mobile application may be located on a mobile device and used by a local user. The UAV landing platform further communicates with the cloud network and may communicate with the cloud network over a unidirectional virtual private network.

In some embodiments, the UAV landing platform includes one or more computer-readable storage media having program instructions stored thereon to facilitate initiating UAV flight sequences and processing imagery collected during a UAV flight sequence. The UAV landing platform may register users as tenant users, which includes assigning a tenant token ID to each of the at least one tenant users and storing this tenant token ID on the local storage system.

Now referring to the Figures, FIG. 1 illustrates an exemplary operating environment 100 in which some embodiments of the present technology may be utilized. FIG. 1 includes environment 100 which shows a drone 101 operating in the vicinity of a building and surrounding landscape along with a drone launch pad 110. The drone launch pad 110 may include a housing to store a plurality of components and may further include a support structure that allows the drone launch pad 110 to statically rest on the ground. The support structure may constitute legs, columns, or a platform, or any other type of support structure which allows the drone launch pad 110 to rest on the ground. Drone 101 may be a UAV, a fixed wing aircraft, a rotary wing aircraft, or a similar aircraft capable of site inspection. The drone is not limited by size, shape, or mode of propulsion which may include rotary power, jet power, a similar mode of propulsion, or a combination thereof. Environment 100 is not limited by structure type nor is it limited by structure number. Structures shown in environment 100 may include schools, factories, private residences, industrial facilities, public buildings, hospitals, pipelines, golf courses, or similar man-made structures or combinations thereof. Environment 100 is not limited by landscape type, landscape features, or the number of landscape features. Landscapes types may include man-made landscapes, natural landscapes, or any similar landscape or combination thereof. Landscape features may include trees, shrubs, grasses, rocks, rock formations, pavements, bodies of water, or other landscape features and combinations thereof.

Still referring to FIG. 1, drone 101 operating in the in the vicinity of the structure images the structure and surrounding landscape while in flight. Drone 101 takes-off from the drone launch pad 110 and flies along a pre-specified flight path. During flight, drone 101 images the structure and the surrounding landscape with one or more imaging devices located on the drone. In some embodiments, drone 101 may be equipped with a plurality of camera types including RGB cameras, LiDAR devices, thermal cameras, gas cameras, infrared cameras, or similar types of imaging devices and combinations thereof. Drone 101 captures image data related to any aspect of the structure such as the roof, walls, windows, doorways, piping, or similar features of the structure. Drone 101 can also capture image data of the surrounding property including image data of any landscape features such as trees, shrubs, rocks, bodies of water, or agricultural property other landscape features that may be present on the property. During flight, all image data collected during is stored on a memory device local to the drone. Once drone 101 has fully executed the predefined flight plan, it returns to drone launch pad 110 where it lands and uploads all image data collected during flight.

Figure 2:
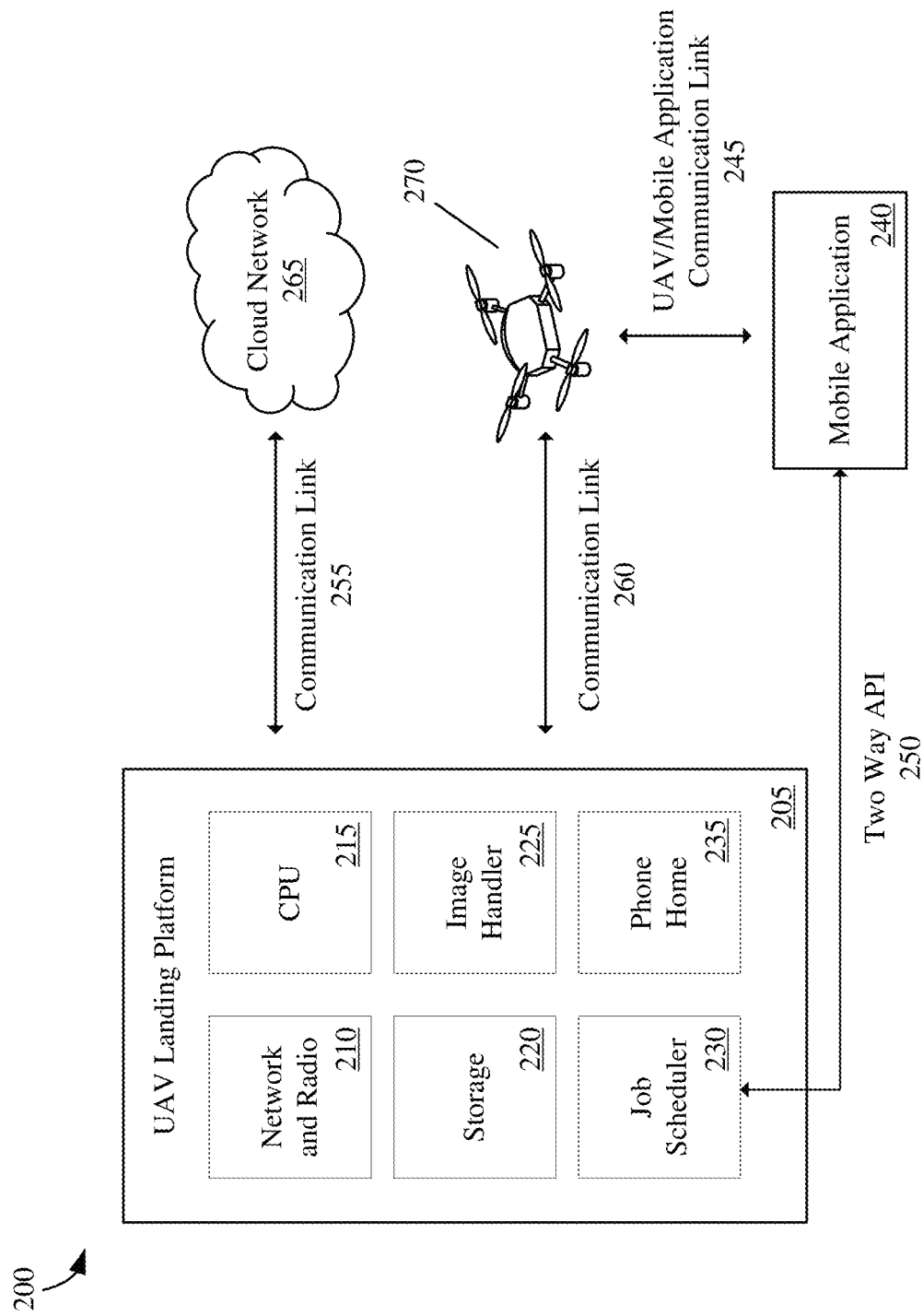
FIG. 2 illustrates an example of communications between a UAV landing platform and various components in accordance with some embodiments of the present technology.

FIG. 2 illustrates an exemplary embodiment of a UAV landing platform in accordance with various embodiments of the present technology. In the embodiments illustrated in environment 200 in FIG. 2, a UAV landing platform 205 handles the necessary functions to initiate UAV image gathering and property image data processing. In some embodiments, a UAV landing platform 205 is located at a site that is to be imaged. UAV landing platform 205 can include network and radio 210, central processing unit (CPU) 215, storage 220, image handler 225, job scheduler 230, and phone home 235. Job scheduler 230 can communicate with mobile application 240 over two-way API 250. UAV landing platform 205 can communicate with cloud network 265 over communication link 255. UAV landing platform 205 also communicates with UAV 270 over communication link 260. Mobile application 240 can communicate with UAV 270 by means of UAV/mobile application communication link 245.

In the embodiments illustrated in FIG. 2, UAV landing platform 205 incorporates a launch pad that allows UAV 270 to take off from and land on. UAV landing platform 205 may further incorporate a support structure which allows the UAV landing platform to rest securely on the ground and a housing to hold the various electrical components. Incorporated into UAV landing platform 205 is phone home 235. Phone home 235 utilizes network and radio 210 to establish a connection with cloud network 265 over communication link 255. Communication link 255 may be any wireless or wired communication link capable of transmitting information. In some embodiments, communication link 255 is a unidirectional virtual private network (VPN). In the embodiments illustrated in FIG. 2, once the connection with cloud network 265 is established, job scheduler 230 retrieves a flight plan from cloud network 265. Cloud network 265 then transmits the flight plan back to UAV landing platform 205 via communication link 255. Once the flight plan is received by UAV landing platform 205, the flight plan can be processed by CPU 215 and stored locally on storage 220. CPU 215 may include any processor, micro-processor, logic device, or any similar devices and any combination thereof. Storage 220 may include hard disc drives, flash drives, or any similar devices or any combination thereof.

A UAV flight capability is assessed, in some embodiments, over communication link 260 by UAV landing platform 205. When UAV 270 is assessed and determined to be capable of flight, a flight plan is relayed to UAV 270 via communication link 260. Job scheduler 230 communicates with mobile application 240 over two-way application programming interface (API) 250 to signal the UAV flight status as "ready" and to confirm a UAV flight sequence. Once the UAV flight sequence is confirmed on mobile application 240, a signal is set back to the UAV flight pad to initiate a UAV flight sequence. Once received, UAV landing platform 205 initiates a UAV flight sequence over communication link 260. During a UAV flight sequence, network and radio 210 maintains communication with UAV 270 over communication link 260. UAV 270 collects property image data and transmits property image data to the UAV landing platform over communication link 260 when the UAV flight sequence is complete. Once the property image data is received by UAV landing platform 205, image handler 225 processes the property image data, where it is configured for local storage on storage 220 and transmitted to cloud network 265 over communication link 255.

Figure 3:
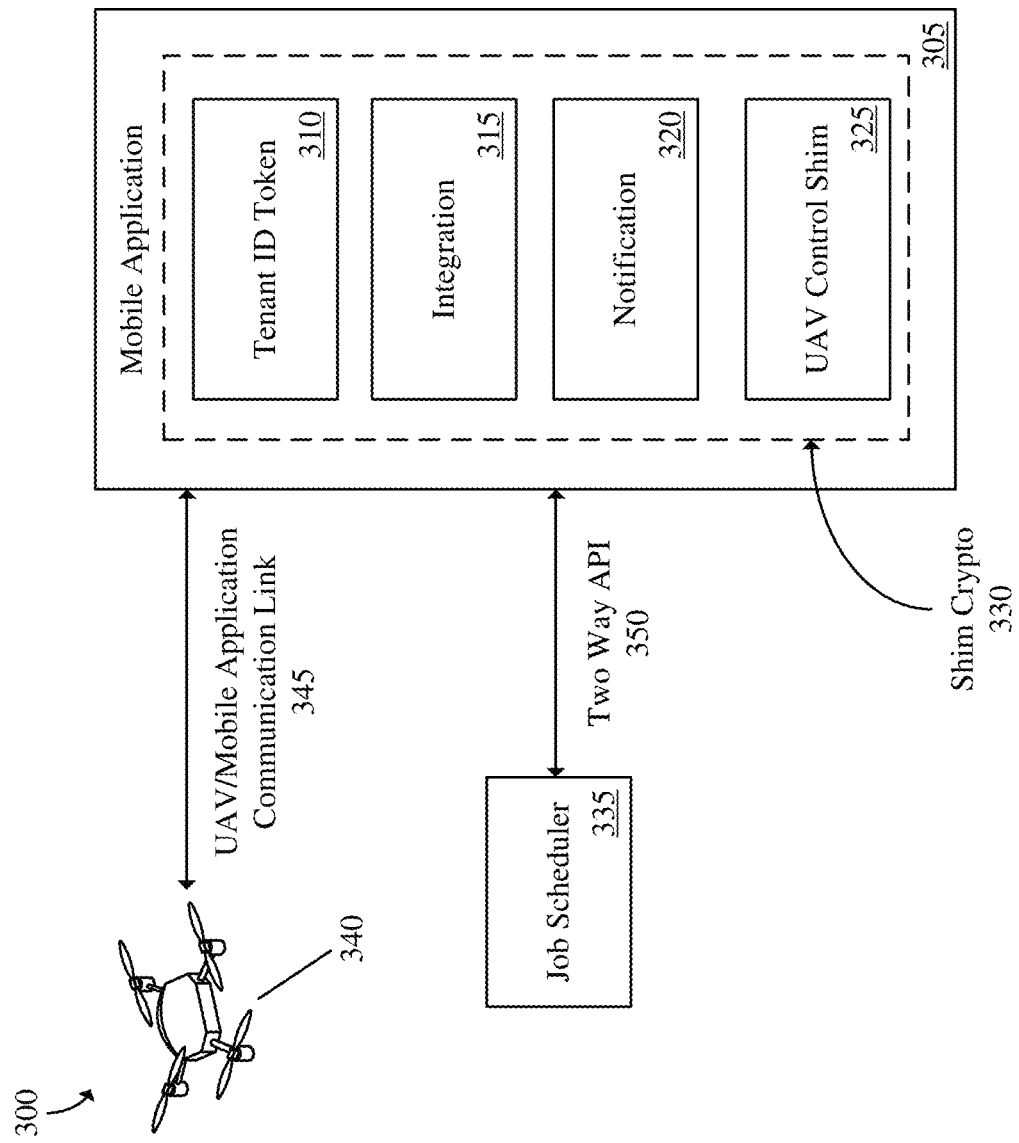
FIG. 3 illustrates an example of a mobile application in accordance with some embodiments of the present technology.

FIG. 3 illustrates a mobile application in accordance with some embodiments of the present technology. In the embodiments illustrated in FIG. 3, a job scheduler located in a UAV landing platform communicates information from the UAV landing platform to a mobile application. The mobile application processes the information received by the job scheduler and upon processing, returns the processed information to the job scheduler. FIG. 3 includes environment 300, where environment 300 includes mobile application 305, job scheduler 335, two-way API 350, UAV/mobile application communication link 245, and UAV 340. Mobile application 305 further incorporates tenant ID token 310, integration 315, notification 320, UAV control shim 325, and shim crypto 330. Mobile application 305 communicates with job scheduler 230 over two-way API 350. Mobile application 305 further communicates with UAV 340 over UAV/mobile application communication link 345.

In some examples, job scheduler 335 requests a flight initiation from mobile application 305. Upon request, notification 320 will notify a user of the flight initiation request. Once the flight initiation request is approved by a user, mobile application 305 responds to job scheduler 335 over two-way API 350. Shim crypto 330 maintains security for the mobile application such that only approved information can be transmitted over two-way API 350 and UAV/mobile application communication link 345. Tenant ID token 310 provides a content identifier for information received and transmitted by the mobile application. Integration 315 allows the mobile application to properly function on a mobile device. In some examples, the mobile device may be a tablet, a phone, or any other similar device or any other combination thereof. UAV control shim 325 provides UAV control functionality for the mobile application. In some examples, UAV control shim 325 allows mobile application 305 manual control of UAV 340 via UAV/mobile application communication link 345. In some examples, mobile application 305 controls take off, landing, flight, or other UAV related functions or combination thereof.

Figure 4:
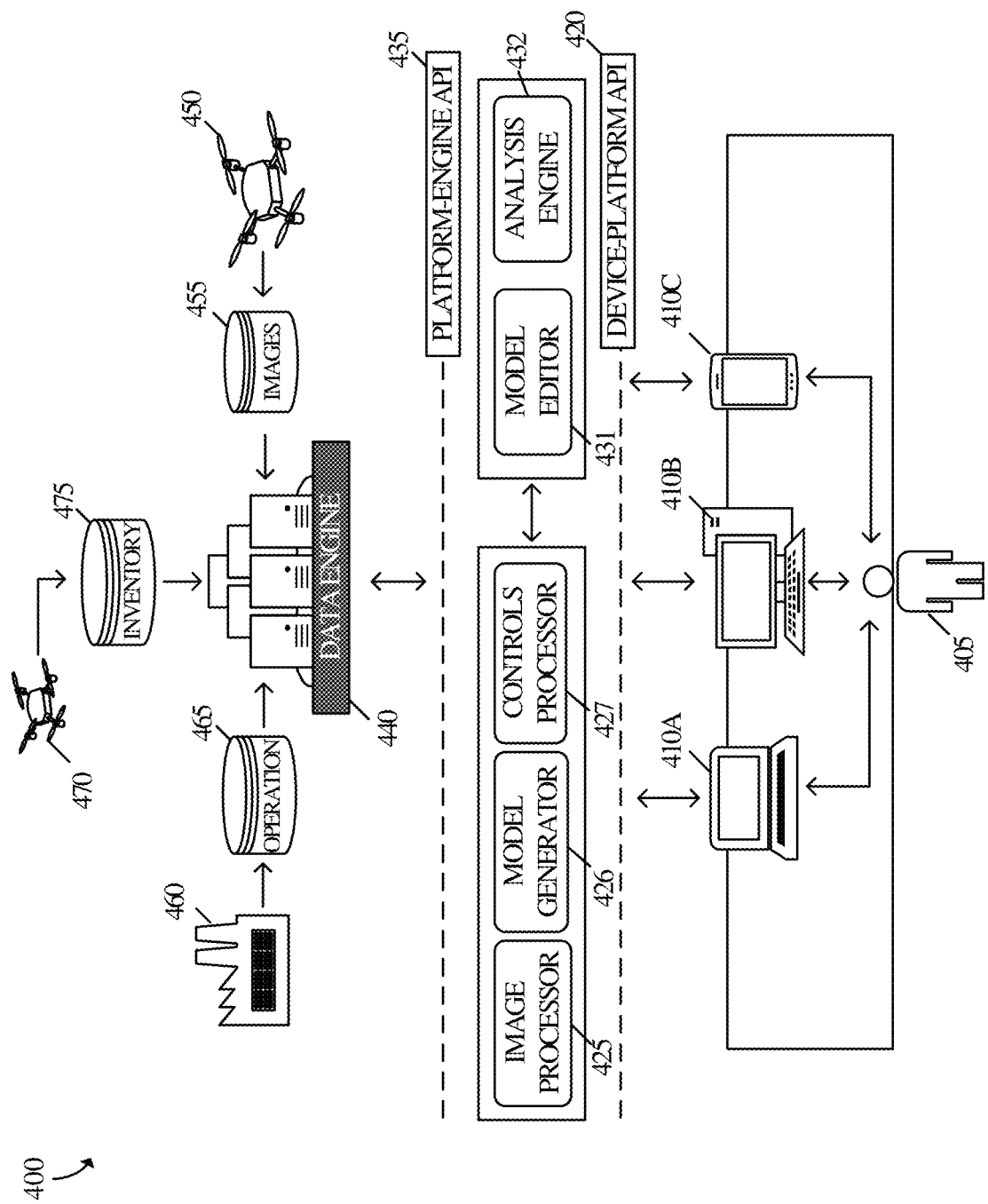
FIG. 4 illustrates an example of a computing platform and various interactions within the computing platform in accordance with some embodiments of the present technology.

FIG. 4 illustrates an exemplary embodiment of a computer system for the handling and processing of image data collected during a UAV flight sequence and, following the processing of the image data, the transmission of the image data to an end user. FIG. 4 illustrates environment 400 which includes end user 405, computing devices 410A, 410B, and 410C, device-platform API 420, image processor 425, model generator 426, controls processor 427, model editor 431, analysis engine 432, platform-engine API 435, data engine 440, UAV 450, image bin 455, structure bin 469, operation bin 465, UAV 470, and inventory bin 475. During a UAV flight sequence, UAV 450 and UAV 470 deposit property image data and other relevant data collected during flight into image bin 455 and inventory bin 475. In some embodiments, relevant data may include take-off time, flight duration, flight path, altitude, or similar flight metrics or any combination thereof. In other examples, image data collected during flight may include, landscape image data, thermal image data, wall image data, roof image data, and global positioning system data. Additional operation data specific to structure 460 can be deposited in the operation bin. The additional operation data may include content identifiers specific to the location being imaged.

Inventory bin 475, image bin 455, and operation bin 465 transmit all information gathered during a flight sequence to data engine 440. Data engine 440 collates and processes all the data collected during a flight sequence and transfers the processed data through platform-engine API 435 to image processor 425, model generator 426, and controls processor 427. In some examples, image processor 425, model generator 426, and controls processor 427 transform the data received by data engine 440 into a comprehensive model of structure 460. Once the model of structure 460 is generated, the model is transferred to model editor 431 and analysis engine 432. Model editor 431 and analysis engine 432 utilize device-platform API 420 to communicate the model to one or more of computing devices 410A, 410B, and 410C. Once the connection between the one or more computing devices 410A, 410B, and 410C has been established, the model is accessed by end user 405. In some embodiments, once the connection is made between model editor 431 and analysis engine 432 to the one or more computing devices 410A, 410B, and/or 410C, an end user may manipulate, edit, or annotate the generated model.

Figure 5:
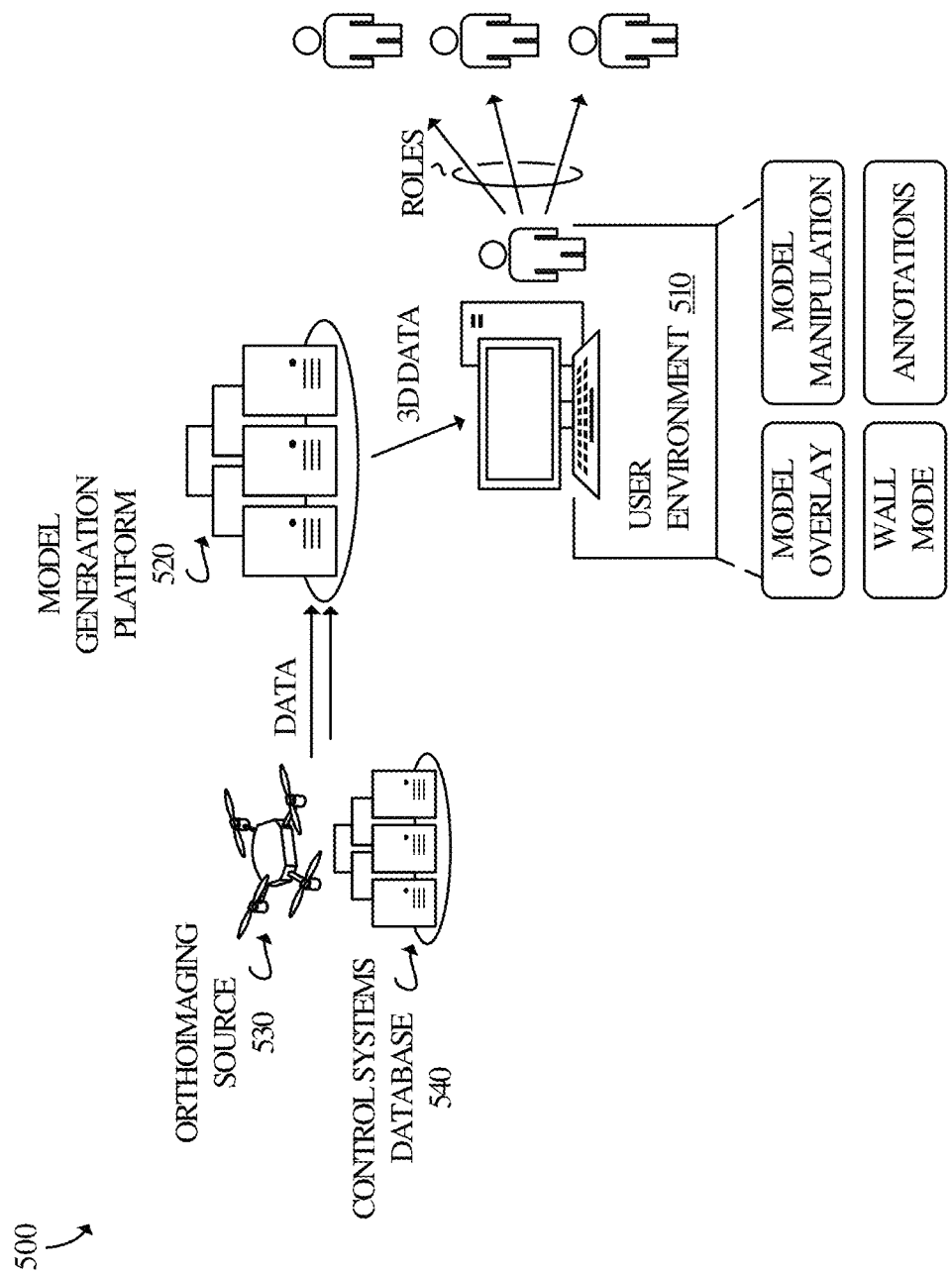
FIG. 5 illustrates an example of communications between a UAV landing platform system and various components in accordance with some embodiments of the present technology.

FIG. 5 illustrates an exemplary embodiment of communications between a drone landing platform system and other components for the transformation of property image data into a user accessible model. FIG. 5 includes environment 500 which further includes user environment 510, model generation platform 520, orthoimaging source 530, and control systems database 540. In some examples, orthoimaging source 530 can constitute a drone which collects property image data during flight. The property image data collected during a drone flight may further include orthorectified imagery gathered during flight. Control systems database 540 reformats property image data gathered during flight and transfers the reformatted data to model generation platform 520. In some examples, the property image data is reformatted into drawing exchange format (DXF) and stereolithography (STL) files.

Model generation platform 520 transforms data received by the control systems database into a three-dimensional (3D) model of the imaged structure. In some examples, the model generation platform creates orthomosaic images that include a wall mode. The wall mode may include sections of the structure or landscape considered to be a vertical surface of the specified structure or landscape. In other examples, model generation platform 520 creates a 3D wireframe image of the structure and iteratively overlays wall mode images, physical landscape images, or other ancillary images collected during flight. Model generation platform 520 transfers 3D data to user environment 510. User environment 510 incorporates a model overlay function, a model manipulation function, a wall mode function, and an annotations function.

In some embodiments, user environment 510 creates iterative annotation grid points on a 3D image of the structure. The annotation grid points can create an array where user relevant files can be loaded and indexed for each annotation point. The annotation grid points can further include individual descriptors such as strings or text for description of the specified annotation grid point. In some embodiments, user environment 510 can receive additional 3D data from the model generation platform and overlay the newly received 3D data onto previously existing 3D image models.

Figure 6:
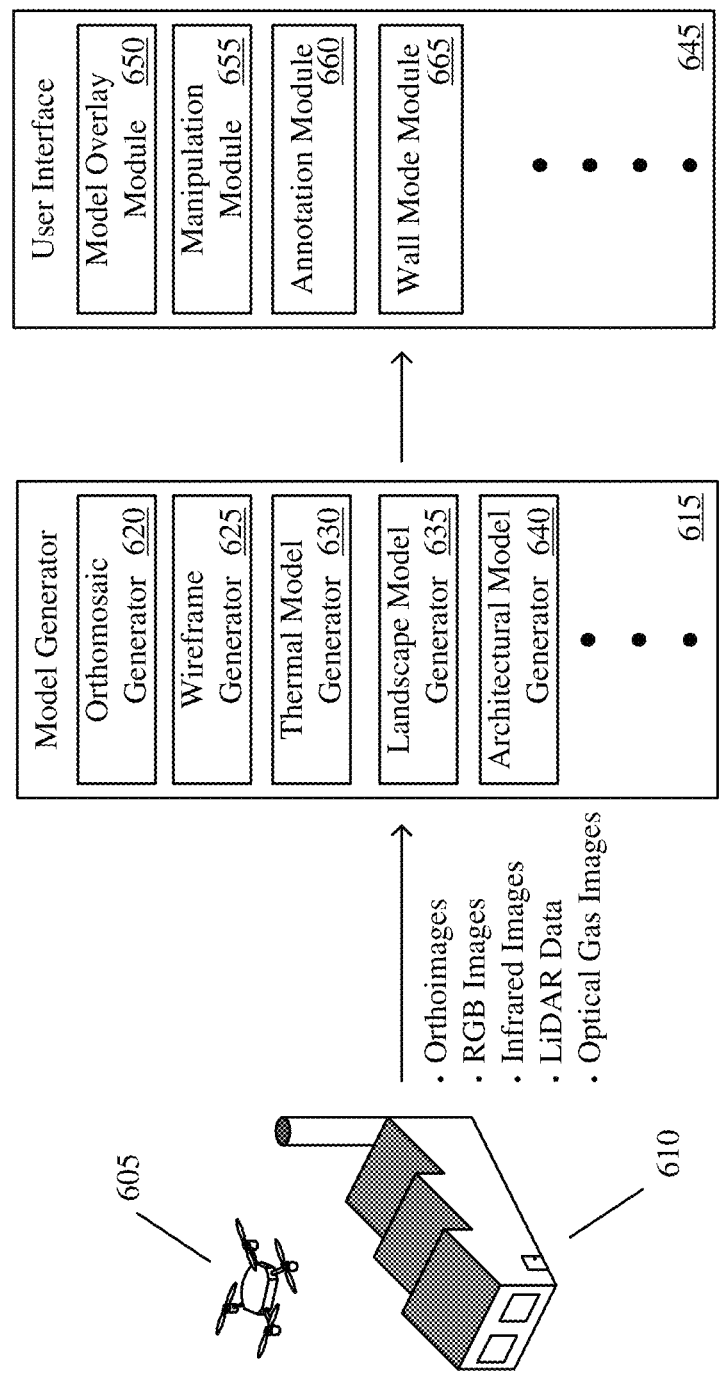
FIG. 6 illustrates an example of communications between a UAV landing platform system and various components in accordance with some embodiments of the present technology.

FIG. 6 illustrates an example of communications between a UAV launch pad and other components in accordance with some embodiments of the present technology for the imaging and model generation of a structure. The property image data of the structure is gathered by a UAV and transmitted to a model generator where the model generator transfers the generated model to a user interface for access by an end user. FIG. 6 includes drone 605, structure 610, model generator 615, and user interface 645. Model generator 615 further contains orthomosaic generator 620, wireframe generator 625, thermal model generator 630, landscape model generator 635, and architectural model generator 640. User interface 645 can additionally include model overlay module 650, manipulation module 655, annotation module 660, and wall mode module 665.

In some embodiments, drone 605 collects property image data of structure 610. The property image data collected by the drone may include orthoimages, red green blue (RGB) images, infrared images, light detection and ranging (LiDAR) data, and optical gas images. drone 605 transfers property image data to a drone launch pad system which sends the property image data to model generator 615 where a 3D model of structure 610 is constructed. In some embodiments, model generator 615 builds a 3D wireframe image and an orthomosaic image of structure 610 from the property image data received from the drone launch pad system. In further examples, model generator 615 creates a thermal model, a landscape model and an architectural model of structure 610 from the property image data received from drone 605. Model generator 615 transfers the generated 3D models of structure 610 to user interface 645.

User interface 645 processes models received by model generator 615. In some embodiments, model overlay module 650 overlays one or more models onto the 3D wireframe generated in model generator 615. Manipulation module 655 presents generated modules to an end user and creates a platform for the manipulation of the one or more generated models by the end user. Annotation module 660 creates iterative annotation grid points on the 3D wireframe image received by model generator 615. In some embodiments, the annotated grid points may constitute an array on the 3D wireframe image where data objects such as Word document (DOCX) files, portable document format (PDF) files, joint photographic exports group (JPEG) files, portable network graphics (PNG) files, or other similar files are loaded at each grid point. Grid points may also include individual descriptors such as strings, text, or any other relevant descriptor. Wall mode module may allow for the visualization of vertical surfaces present in structure 610. In some examples, wall mode module can overlay vertical imagery onto the 3D wireframe image generated in model generator 615.

Figure 7:
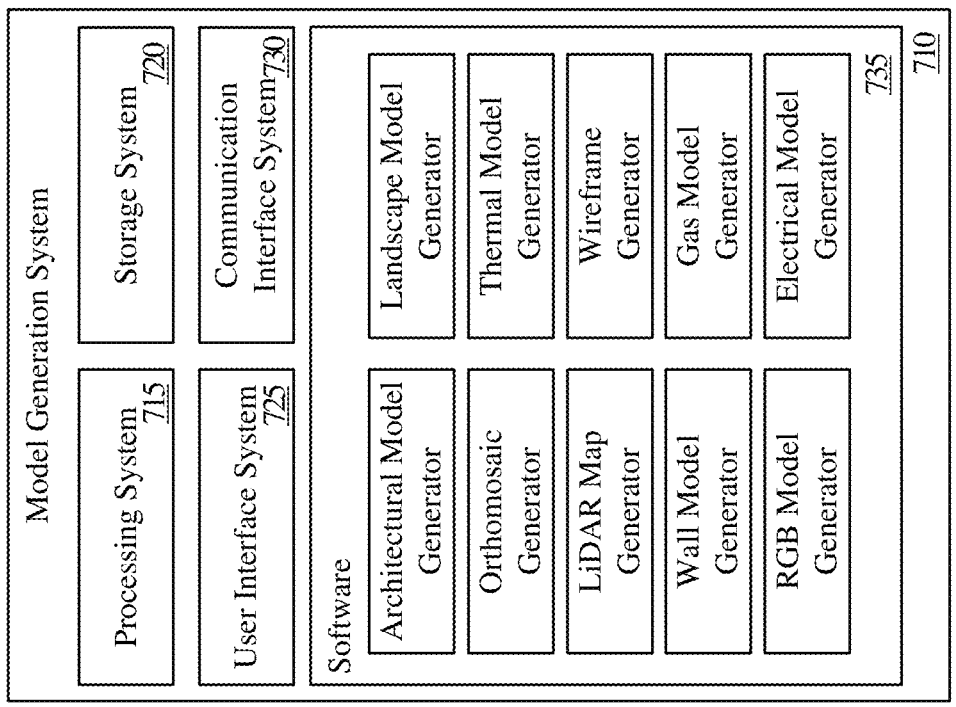
FIG. 7 illustrates an example of a model-generating system in accordance with some embodiments of the present technology.

FIG. 7 illustrates and exemplary model generation system. The model generation system process property image data collected during a UAV flight sequence to generate models of the imaged structure. Model generating system 710 includes processing system 715, storage system 720, user interface system 725, communication interface system 730, and software 735. Software 735 may include an architectural model generator, landscape model generator, orthomosaic generator, thermal model generator, LiDAR map generator, wireframe generator, wall model generator, gas model generator, RGB model generator, electrical model generator, or any combination of the aforementioned models.

In some embodiments, the architectural model generator of software 735 constructs a 3D image representative of the various architectural components. Such components may include building width, building height, building surface area and overall building structure or any other architecture associated with a specified building. The landscape model generator of software 735 constructs a 3D model of the surrounding landscape of a structure. The 3D model may include trees, plants, bodies of water, or other geography that a landscape may possess. The landscape model may provide detail to differentiate the various objects that could be present in the surrounding landscape of a structure as well as details on the location of the one or more landscape objects in relation to the structure. The orthomosaic generator of software 735 creates geometrically corrected images of the structure such that the distance between objects on the structure or the landscape can be measured.

In other embodiments, the orthomosaic generator of software 735 may generate images with a uniform scale. The thermal model generator of software 735 creates a thermal image of a structure. The thermal image includes a temperature map of the surfaces of a building and may further include a map of heat sources that exist on a building. The LiDAR map generator of software 735 generates a high-resolution 3D image of the structure and the surrounding terrain. The LiDAR map provides the relative heights of objects as well as elevation information of the surrounding landscape. The wireframe generator of software 735 constructs a wireframe image of the structure. The wall model generator of software 735 builds a 3D image representing the vertical surfaces of the structure or surrounding landscape or any combination thereof. The constructed wall mode 3D image differentiates vertical surfaces from horizontal surfaces and may further detail the number and size of each vertical surface. The 3D image generated by the wall model generator further details the relative position of vertical surfaces to horizontal surfaces. The gas model generator of software 735 generates an image detailing gasses or gas flows that may exist on the exterior of a structure. The RGB model generator of software generates a color image of the structure and the surrounding landscape. The electrical model generator of software 735 creates an image that details electrical components on the surface of a structure or electrical components of the surrounding landscape of a structure.

Figure 8:
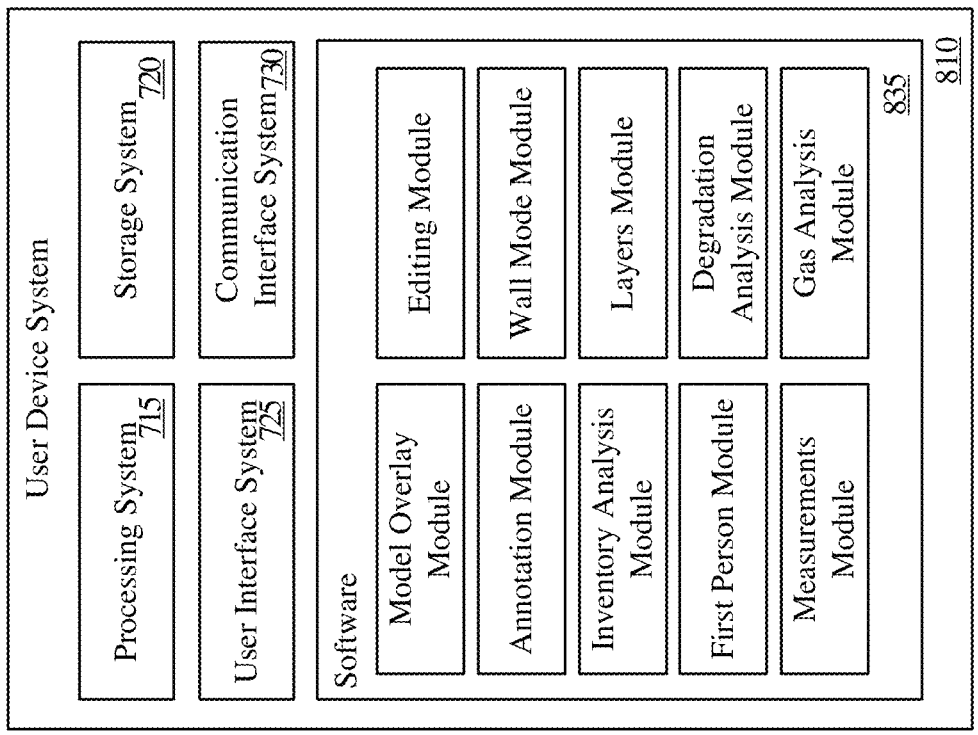
FIG. 8 illustrates an example of a user device system in accordance with some embodiments of the present technology.

FIG. 8 illustrates a user device system for the processing and manipulation of models generated by a model generation system. FIG. 8 includes user device system 810, processing system 715, storage system 720, user interface system 725, communication interface system 730, and software 835. Software 835 may optionally include any of a model overlay module, an editing module, an annotation module, a wall mode module, an inventory analysis module, a layers module, a first person module, a degradation analysis module, a measurements module, a gas analysis module, or any combination of the aforementioned modules.

The model overlay module of software 835 overlays one or more models onto a base wireframe model. The models overlaid onto the wireframe model may constitute a layer of separate models, may be integrated into a single overlaid model, or any combination thereof. The model overlay module also overlays additional models onto a 3D wireframe module that has already been overlaid. The editing module of software 835 edits models received by user device system 810. In some embodiments, the edits can constitute insertions, deletions, or similar changes or combinations thereof to the objects that exist within a specified model.

The annotation module of software 835 adds annotations onto a specified model. The annotations may be iterative annotation grid points overlaid onto the 3D image of the model. The annotation grid points constitute an array and may further include files such as DOCX, JPEG, PDF, PNG, or any similar file type capable of storing information. The annotation grid points may additionally include an annotation drop pin with strings or text for description of the annotation drop pin. The wall mode module of software 835 is used to identify vertical surfaces of a structure or landscape and may be further used to differentiate vertical surfaces from horizontal surfaces. The inventory analysis module of software 835 categorizes objects that exist in a 3D image or a model. The layers module of software can manage the layers that have been overlaid onto a 3D wireframe image of the structure or landscape. The first person module of software 835 allows for the viewing of a 3D image or model from a first person perspective. The first person module may further allow for a first person viewing perspective from various locations within a 3D module or image. The measurements module of software 835 allows for the determination of distances, heights, areas, volumes, or other metrics in a model or 3D image. The gas analysis module of software 835 allows for the identification and labeling of gasses or gas flows identified in a model or 3D image.

Referring now to FIG. 7 and FIG. 8, the computing system which software 735 and software 835 runs on may be the same computing system. However, the one or more computing systems which contain software 735 and software 835 may have similar functionality. FIG. 7 and FIG. 8 illustrate model generation system 710 and user device system 810 that are representative of any system or collection of systems in which the various processes, programs, services, and scenarios disclosed herein may be implemented. Examples of model generation system 710 and user device system 810 include, but are not limited to, desktop computers, laptop computers, server computers, routers, web servers, cloud computing platforms, and data center equipment, as well as any other type of physical or virtual server machine, physical or virtual router, container, and any variation or combination thereof.

Model generation system 710 and user device system 810 may be implemented as a single apparatus, system, or device or may be implemented in a distributed manner as multiple apparatuses, systems, or devices. Model generation system 710 and user device system 810 include, but are not limited to, processing system 715, storage system 720, software 735 or software 835, communication interface system 730, and user interface system 725. Processing system 715 is operatively coupled with storage system 720, communication interface system 730, and user interface system 725.

Processing system 715 loads and executes software 735 or software 835 from storage system 720. Software 735 or software 835 include and implement their respective processes, which is representative of the isolation and/or provisioning processes discussed with respect to the preceding Figures. When executed by processing system 715 to provide application isolation and/or provisioning, software 735 or software 835 direct processing system 715 to operate as described herein for at least the various processes, operational scenarios, and sequences discussed in the foregoing implementations. Model generation system 710 and user device system 810 may optionally include additional devices, features, or functionality not discussed for purposes of brevity.

Referring still to FIG. 7 and FIG. 8, processing system 715 may include a micro-processor and other circuitry that retrieves and executes software 735 or software 835 from storage system 720. Processing system 715 may be implemented within a single processing device but may also be distributed across multiple processing devices or sub-systems that cooperate in executing program instructions. Examples of processing system 715 include general purpose central processing units, graphical processing units, application specific processors, and logic devices, as well as any other type of processing device, combinations, or variations thereof.

Storage system 720 may incorporate any computer readable storage media readable by processing system 715 and capable of storing software 735 or software 835. Storage system 720 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 720 may also include computer readable communication media over which at least some of software 735 or software 835 may be communicated internally or externally. Storage system 720 may be implemented as a single storage device but may also be implemented across multiple storage devices or sub-systems co-located or distributed relative to each other. Storage system 720 may include additional elements, such as a controller, capable of communicating with processing system 715 or possibly other systems.

Software 735 or software 835 (including their respective processes) may be implemented in program instructions and among other functions may, when executed by processing system 715, direct processing system 715 to operate as described with respect to the various operational scenarios, sequences, and processes illustrated herein. For example, software 735 or software 835 includes program instructions for implementing an isolation process and/or a provisioning process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 735 or software 835 may include additional processes, programs, or components, such as operating system software, virtualization software, or other application software. Software 735 or software 835 may also include firmware or some other form of machine-readable processing instructions executable by processing system 715.

In general, software 735 or software 835 may, when loaded into processing system 715 and executed, transform a suitable apparatus, system, or device (of which model generation system 710 and user device system 810 is representative) overall from a general-purpose computing system into a special-purpose computing system customized to provide application isolation and/or provisioning as described herein. Indeed, encoding software 735 or software 835 on storage system 720 may transform the physical structure of storage system 720. The specific transformation of the physical structure may depend on various factors in different implementations of this description. Examples of such factors may include, but are not limited to, the technology used to implement the storage media of storage system 720 and whether the computer-storage media are characterized as primary or secondary storage, as well as other factors.

For example, if the computer readable storage media are implemented as semiconductor-based memory, software 735 or software 835 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 730 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between model generation system 710 or user device system 810 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 9:
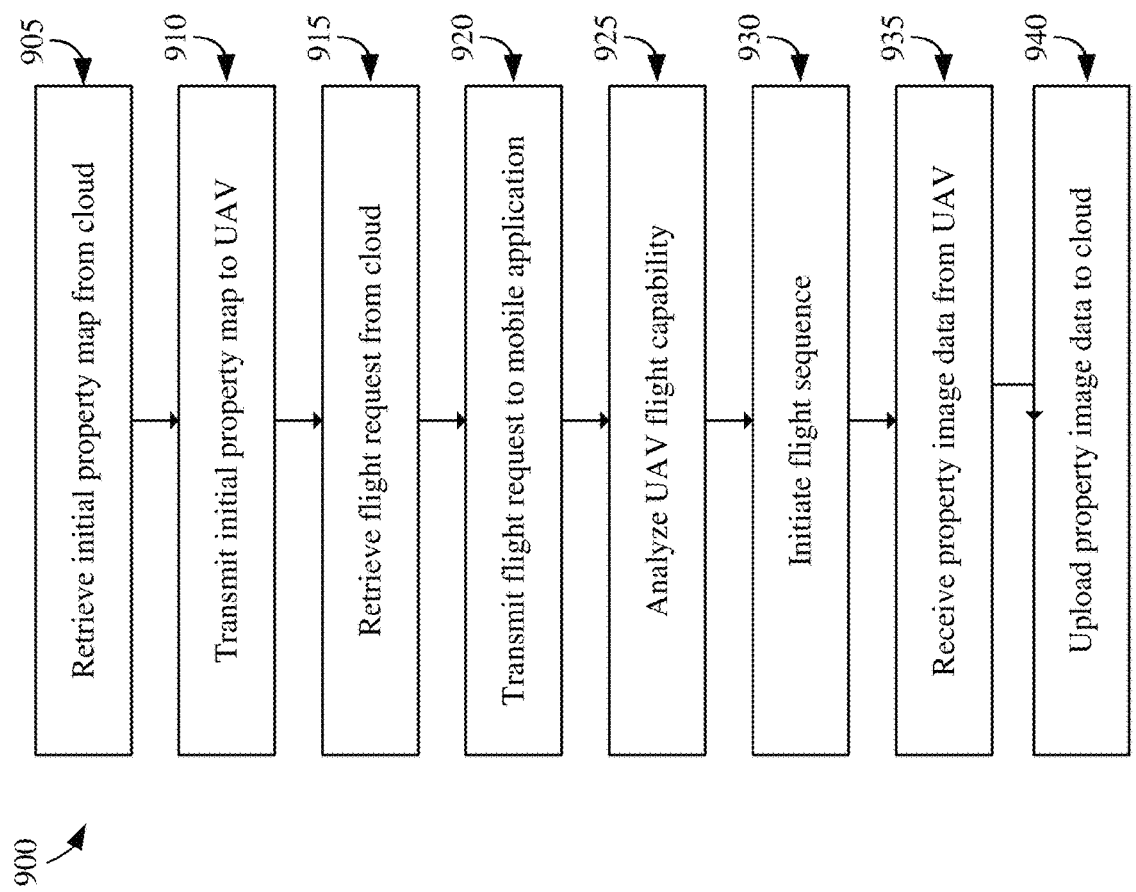
FIG. 9 is a flowchart illustrating a set of operations for a UAV landing platform in accordance with some embodiments of the present technology.

FIG. 9 illustrates an exemplary set of operations for a method of operating a UAV landing platform. The method of operation details the steps performed by the landing platform during normal operation. FIG. 9 includes environment 900 in which a series of operations are shown. Operation 905 includes the retrieval of an initial property map from a cloud application. The cloud application may include a multitenant cloud application. In operation 910, the UAV landing platform transmits the initial property data received from the cloud application to the UAV. In operation 915, the UAV landing platform retrieves a flight request from the cloud application. In operation 920, the UAV landing platform transmits the flight request that it retrieved from the cloud application to a mobile application. In operation 925, the UAV landing platform analyzes a UAV flight capability. The analyzing of the UAV flight capability may include determining UAV battery power, UAV responsiveness, or analyzing other resource the UAV may need for successful flight. In operation 930, the UAV landing platform initiates a UAV flight sequence which allows the UAV to take off. In operation 935, after the UAV returns to the UAV landing platform, the platform receives property image data from the UAV. Finally, in operation 940, the UAV landing platform uploads property image data to the cloud application.

Figure 10:
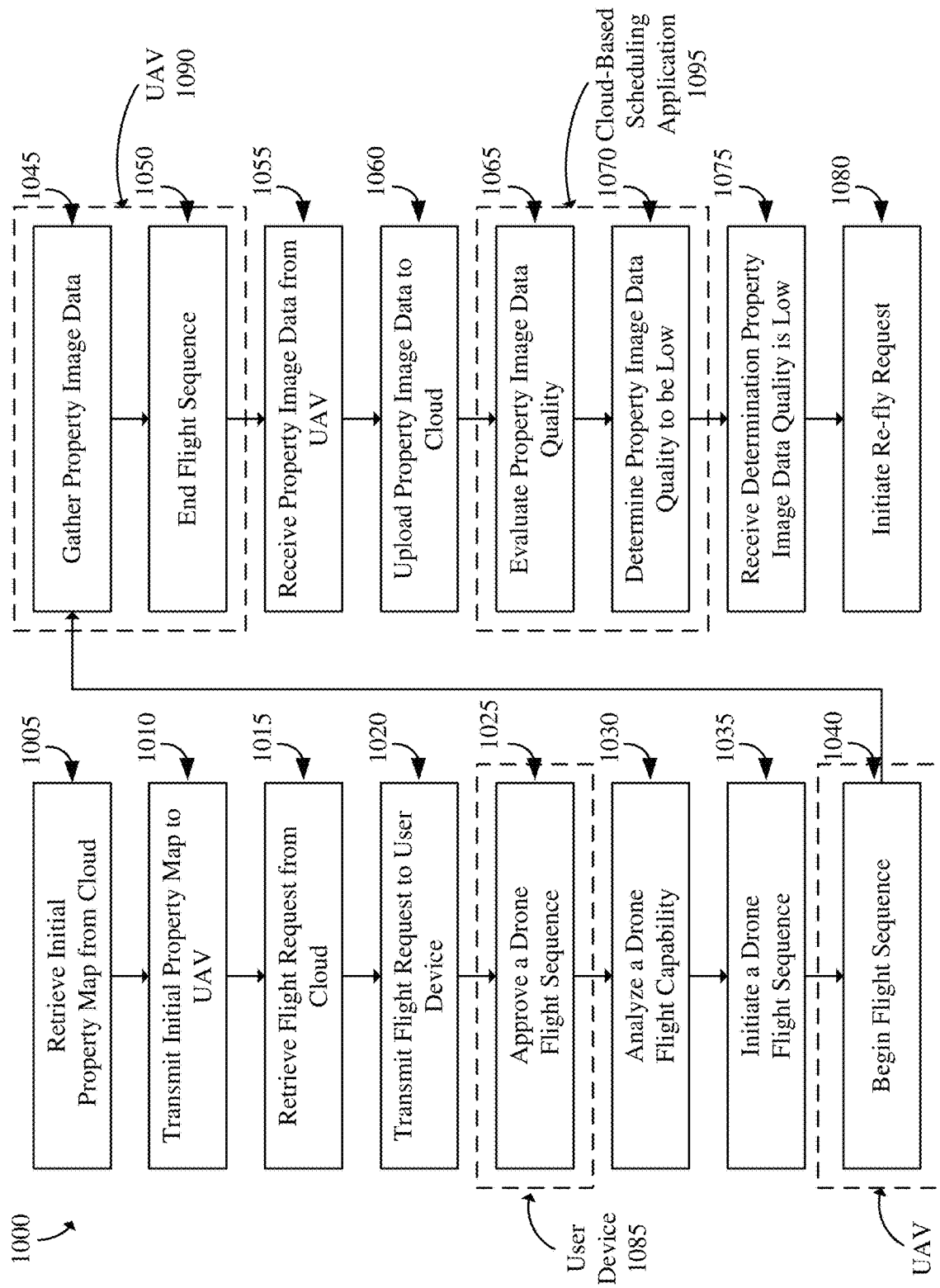
FIG. 10 is a flowchart illustrating a set of operations for a UAV landing platform in accordance with some embodiments of the present technology.

FIG. 10 illustrates an exemplary flowchart of another method of operation for a UAV landing platform in relation to other components. The operation of a UAV landing platform requires additional components for the capture and processing of property image data and interactions between the UAV landing platform and the additional components are shown. FIG. 10 includes environment 1000 in which a series of operations are shown. In operation 1005, a UAV landing platform retrieves an initial property map from a cloud where the cloud may be a multitenant cloud-based scheduling application. The network through which UAV landing platform retrieves an initial property map may be a unidirectional virtual private network. In operation 1010, the UAV landing platform transmits the initial property map to a UAV. The transmission may be carried out over a WiFi, Bluetooth, or radio frequency network. In operation 1015, the UAV landing platform retrieves a flight request from the cloud. The cloud may be a multitenant cloud-based application, in some examples. The network that the UAV landing platform retrieves the flight request over may be a unidirectional virtual private network. In operation 1020, the UAV landing platform transmits the flight request to a user device. The transmission may be carried out over a two-way API. The user device may operate a mobile application where a user can review and approve a UAV flight sequence. In operation 1025, user device 1085 approves the UAV flight sequence and responds to the UAV landing platform. In operation 1030, the UAV landing platform analyzes a UAV flight capability. The UAV flight capability may include determining UAV battery power, UAV responsiveness, or analyzing similar resources the UAV may need for a successful UAV flight sequence. In operation 1035, the UAV landing platform initiates a UAV flight sequence. The UAV flight sequence may be initiated over a WiFi, Bluetooth, or radio frequency network.

Still referring to FIG. 10, in operation 1040, UAV 1090 begins the UAV flight sequence. In operation 1045, UAV 1090 gathers property image data using one or more of infrared cameras, GPS, GNSS, LiDAR, RGB cameras, optical gas cameras, orthoimaging cameras, or similar imaging technology or combinations thereof to gather property image data. The property image data may include orthoimages, RGB images, infrared images, LiDAR images, GPS or GNSS images, optical gas images, or similar images of the structure and surrounding landscape. In operation 1050, UAV 1090 ends the flight sequence and UAV 1090 returns to the UAV launch pad. In operation 1055, the UAV landing platform receives the property image data from the UAV over a WiFi, Bluetooth, radio frequency, or similar type of network. In operation 1060, the UAV landing platform uploads the property image data to the cloud wherein the cloud is a multitenant cloud-based application. In operation 1065, cloud-based scheduling application 1095 evaluates the property image data for quality of images; the evaluation may include determining the clarity of image data, the completeness of image data, or other image quality assessments or combinations thereof. The evaluation of the property image data for quality may include a determination that image data quality is poor. In operation 1070, cloud-based scheduling application 1095 determines the property image data quality is low. In operation 1075, the UAV launch pad receives, from cloud-based scheduling application 1095, a determination that the property image data quality is low. Finally, in operation 1080, the UAV landing platform initiates a re-fly request.

Figure 11:
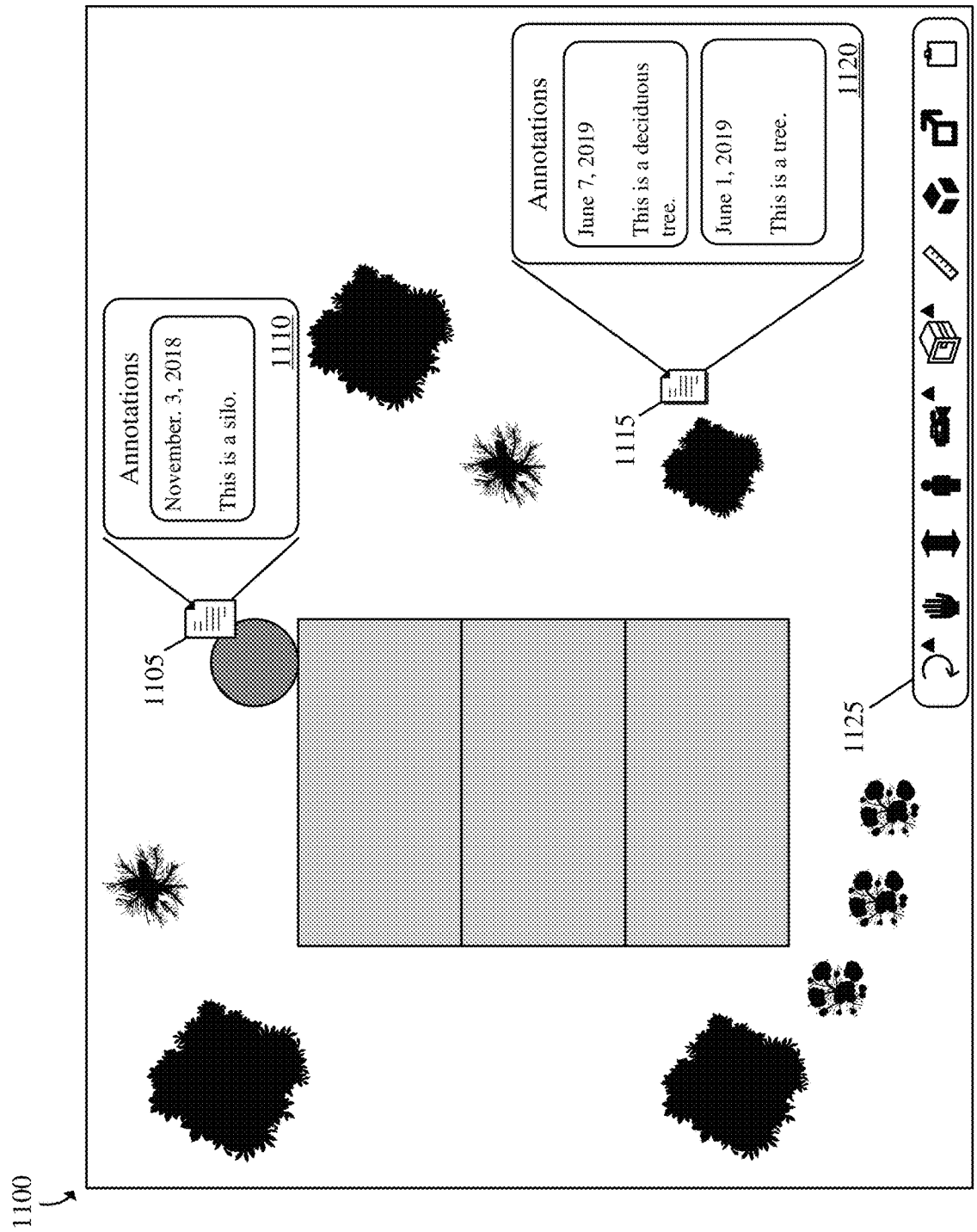
FIG. 11 illustrates an example of a user interface in accordance with some embodiments of the present technology.

FIG. 11 illustrates an exemplary user interface in accordance with some aspects of the present technology. The user interface may be used for the editing and viewing of property image data collected during a drone flight sequence. FIG. 11 contains environment 1100 where a user interface is presented. Annotation grid point 1105 is located in the user interface and contains annotation 1110 identifying an object on a structure presented in the user interface. Annotation grid point 1115 is also located in the user interface and contains annotations 1120 identifying a different object on a landscape presented in the user interface. Annotation 1120 includes multiple annotations to identify the object presented in the user interface. In some embodiments, annotations may be added at a certain date and then amended at a later date, such as the iterative set of annotations provided for annotation grid point 1115. The user interface further contains toolbar 1125 where a variety of options for manipulating the image displayed in the user interface are contained.

Figure 12:
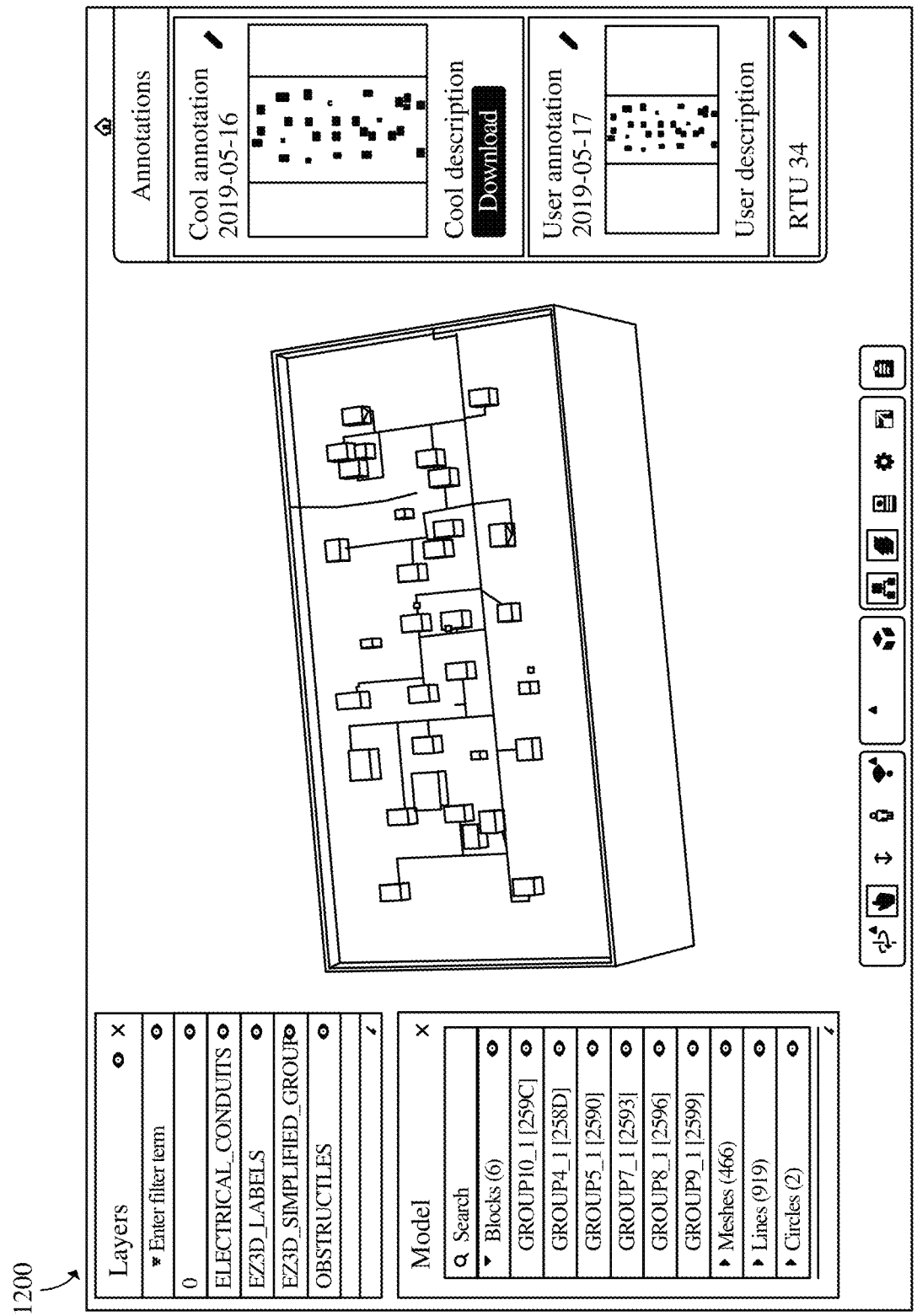
FIG. 12 illustrates an example of a user interface in accordance with some embodiment of the present technology.

Now referring to FIG. 12 illustrating user environment 1200. User Environment 1200 demonstrates an additional example of a user interface in accordance with some embodiments of the present technology. User environment 1200 includes a 3D model of a structure, a toolbar, an annotation function, a layers function, and a model function. The toolbar of user environment 1200 may include tools a user can access to manipulate the 3D model. The annotation function may allow a user to add annotations to the 3D model. These annotations may include descriptors to add additional information about specific objects located on the 3D model. The layers function can allow a user to cycle through the layers that may have been overlaid onto the 3D model. The layers may include a plurality of viewing options such as a thermal viewing option, a wall mode viewing option, or any other viewing option imported into the 3D model. The model function of user environment 1200 may allow the user to access a plurality of models of a plurality of structures.

Figure 13A:
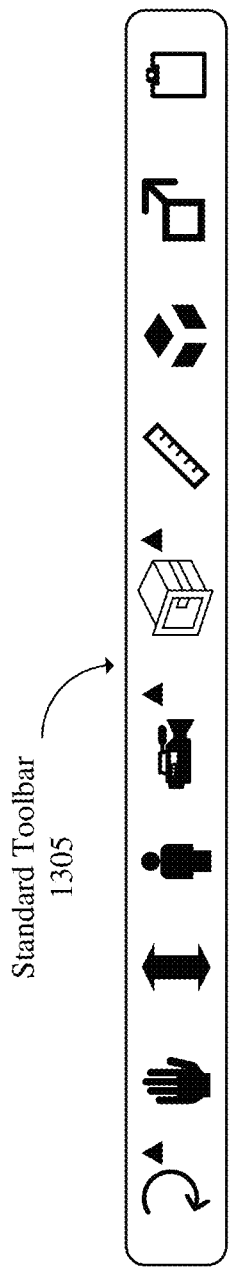
FIGS. 13A, 13B, and 13C illustrate toolbars in accordance with some embodiments of the present technology.
Figure 13B:
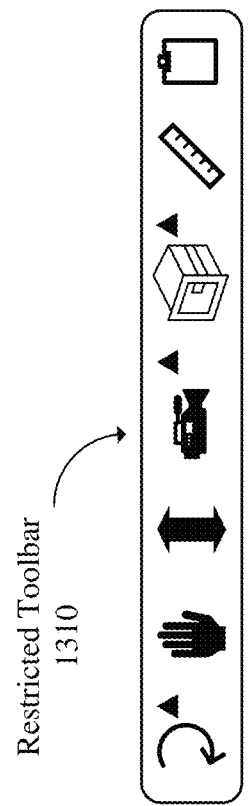
Figure 13C:
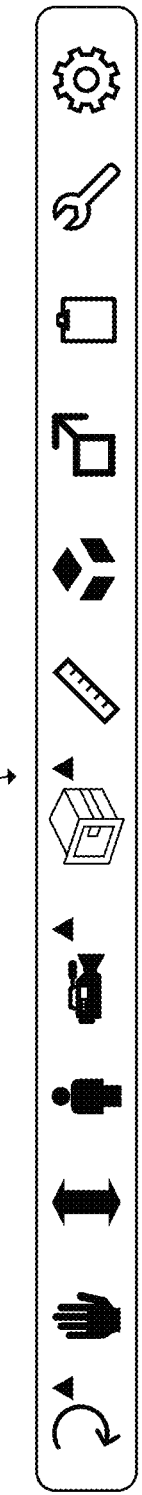

FIGS. 13A, 13B, and 13C illustrate several examples of various toolbars that may be used to manipulate or edit a 3D model created from property image data collected during a UAV flight sequence. The number or type of tools in a toolbar that are available to a user vary from user to user based on user privileges, managerial status, or similar credential-based privacy restrictions. FIG. 13A depicts toolbar 1305 in which a user has access to a plurality of tools for image analysis. In some examples, toolbar 1305 includes tools such as an annotation tool, rotation tool, zoom, aspect, first-person tool, record, measure, and the like. FIG. 13B depicts an example of a restricted toolbar 1310 that may appear on a screen of a user with restricted credentials. In some examples, restricted toolbar 1310 may include the tools of toolbar 1305 with reduced functionality or may include fewer tools than toolbar 1310. FIG. 13C depicts expanded toolbar 1315 that may appear on a screen of a user with expanded credentials. In some examples, toolbar 1315 may include additional tools not included in toolbar 1305 such as an administrative tool and the like. The tools of toolbar 1315 may include the same tools as toolbar 1305 with additional functionality. In some embodiments, each toolbar may be present in a in a plurality of user interfaces where users of varying credentials may manipulate a plurality of models using their respective toolbars.

FIG. 14 illustrates an exemplary sequence diagram for property image collection and model generation in accordance with some embodiments of the present UAV landing platform system. FIG. 14 illustrates sequence diagram 1400 which includes UAV landing platform 1405, UAV 1410, model generation platform 1415, web platform 1420, and user interface 1425. UAV landing platform 1405 retrieves an initial property map and transmits the initial property map to UAV 1410. UAV 1410 proceeds to collect imagery and send the property image data back to the UAV landing platform. UAV landing platform 1405 sends property image data to model generating platform 1415. Model generation platform 1415 performs an image quality check and notifies the UAV landing platform of the results of the image quality check after which an orthomosaic of the property images is created and uploaded to web platform 1420. A user requests to open the model via user interface 1425 whereby user interface 1425 accesses the model and subsequently the model analysis via web platform 1420 Web platform 1420 performs requested analyses on the model received by model generating platform 1415 and notifies user interface 1425 with the results of the model analysis.

Figure 15:
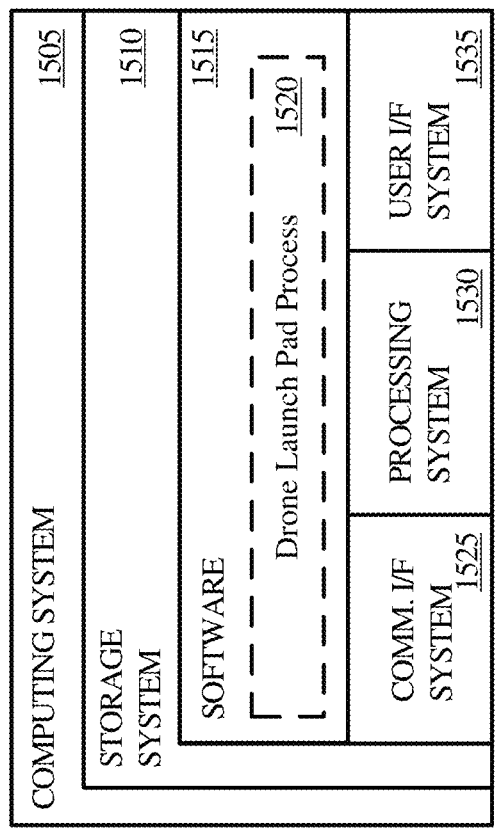
FIG. 15 illustrates an example of a computing system in accordance with some embodiments of the present technology.

FIG. 15 illustrates computing system 1505 that is representative of any system or collection of systems in which the various processes, programs, services, and scenarios disclosed herein may be implemented. For example, this computing system may be implemented in UAV landing platform 205 of FIG. 2 to facilitate operation of the drone launch pad. Further examples of computing system 1505 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 1505 may be implemented as a single apparatus, system, or device or may be implemented in a distributed manner as multiple apparatuses, systems, or devices. Computing system 1505 includes, but is not limited to, storage system 1510, processing system 1530, software 1515, communication interface system 1525, and user interface system 1535. Processing system 1530 is operatively coupled with storage system 1510, communication interface system 1525, and user interface system 1535.

Processing system 1530 loads and executes software 1515 from storage system 1510. Software 1515 includes and implements UAV landing platform process 1520, which is representative of the UAV landing platform processes discussed with respect to the preceding Figures. When executed by processing system 1530 to provide UAV landing platform processes, software 1515 directs processing system 1530 to operate as described herein for at least the various processes, operational scenarios, and sequences discussed in the foregoing implementations. Computing system 1505 may optionally include additional devices, features, or functionality not discussed for purposes of brevity.

Referring still to FIG. 15, processing system 1530 may include a micro-processor and other circuitry that retrieves and executes software 1515 from storage system 1510. Processing system 1530 may be implemented within a single processing device but may also be distributed across multiple processing devices or sub-systems that cooperate in executing program instructions. Examples of processing system 1530 include general purpose central processing units, graphical processing units, application specific processors, and logic devices, as well as any other type of processing device, combinations, or variations thereof.

Storage system 1510 may include any computer readable storage media readable by processing system 1530 and capable of storing software 1515. Storage system 1510 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1510 may also include computer readable communication media over which at least some of software 1515 may be communicated internally or externally. Storage system 1510 may be implemented as a single storage device but may also be implemented across multiple storage devices or sub-systems co-located or distributed relative to each other. Storage system 1510 may incorporate additional elements, such as a controller, capable of communicating with processing system 1530 or possibly other systems.

Software 1515 (including UAV landing platform process 1520) may be implemented in program instructions and among other functions may, when executed by processing system 1530, direct processing system 1530 to operate as described with respect to the various operational scenarios, sequences, and processes illustrated herein. For example, software 1515 may include program instructions for implementing UAV landing platform process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1515 may include additional processes, programs, or components, such as operating system software, virtualization software, or other application software. Software 1515 may also include firmware or some other form of machine-readable processing instructions executable by processing system 1530.

In general, software 1515 may, when loaded into processing system 1530 and executed, transform a suitable apparatus, system, or device (of which computing system 1505 is representative) overall from a general-purpose computing system into a special-purpose computing system customized to provide UAV landing platform processes as described herein. Indeed, encoding software 1515 on storage system 1510 may transform the physical structure of storage system 1510. The specific transformation of the physical structure may depend on various factors in different implementations of this description. Examples of such factors may include, but are not limited to, the technology used to implement the storage media of storage system 1510 and whether the computer-storage media are characterized as primary or secondary storage, as well as other factors.

For example, if the computer readable storage media are implemented as semiconductor-based memory, software 1515 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1525 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1505 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a mobile device, the method comprising:
    receiving one or more multidimensional models of an environment from a model generation platform, wherein the one or more multidimensional models were generated based on image data captured by an unmanned aerial vehicle (UAV) during a UAV flight sequence;
    receiving user input comprising a model analysis request for the one or more multidimensional models;
    executing a model analysis of the one or more multidimensional models based on the model analysis request; and
    enabling display of results of the model analysis for access by an end user.

2. The method of claim 1 wherein the model analysis request comprises one or more of a model overlay request, a model editing request, a model annotation request, a wall mode request, an inventory analysis request, a model layers request, a first person perspective request, a model degradation analysis request, a model measurement request, and a gas analysis request.

3. The method of claim 1 wherein the model analysis request comprises a model overlay request and wherein executing the model overlay request includes overlaying the one or more multidimensional models onto a base wireframe model.

4. The method of claim 1 wherein the model analysis request comprises a model editing request and wherein executing the model editing request includes editing the one or more multidimensional models.

5. The method of claim 1 wherein the model analysis request comprises a model annotation request and wherein executing the model annotation request includes annotating the one or more multidimensional models with grid points.

6. The method of claim 1 wherein the model analysis request comprises a wall mode request and wherein executing the wall mode request includes identifying vertical surfaces of the one or more multidimensional models.

7. The method of claim 1 wherein the model analysis request comprises an inventory analysis request and wherein executing the inventory analysis request includes categorizing objects of the one or more multidimensional models.

8. The method of claim 1 wherein the model analysis request comprises a model layers request and wherein executing the model layers request includes identifying overlaid model layers of the one or more multidimensional models.

9. The method of claim 1 wherein the model analysis request comprises a first person perspective request and wherein executing the first person perspective request includes configuring the one or more multidimensional models to allow a first person perspective.

10. The method of claim 1 wherein the model analysis request comprises a model measurement request and wherein executing the model measurement request includes measuring metrics of the one or more multidimensional models and wherein the metrics include distances, heights, areas, and volumes of objects within the one or more multidimensional models.

11. The method of claim 1 wherein the model analysis request comprises a gas analysis request and wherein executing the gas analysis request includes labeling gases of the one or more multidimensional models.

12. The method of claim 1 wherein the one or more multidimensional models are representative of three-dimensional (3D) models and wherein the 3D models comprise one or more of orthomosaic images, 3D wireframe images, thermal models, landscape models, and architectural models.

13. The method of claim 1 wherein the mobile application receives the one or more multidimensional models over a unidirectional virtual private network.

14. A computing apparatus comprising:
    one or more computer-readable storage media; and
    program instructions stored on the one or more computer-readable storage media that, when executed by a processing system, direct the computing apparatus to at least:
        receive one or more multidimensional models of an environment from a model generation platform, wherein the one or more multidimensional models were generated based on image data captured by an unmanned aerial vehicle (UAV) during a UAV flight sequence;
        receive user input comprising a model analysis request for the one or more multidimensional models;
        execute a model analysis of the one or more multidimensional models based on the model analysis request; and
        enable display of results of the model analysis for access by an end user.

15. The computing apparatus of claim 14 wherein the model analysis request comprises one or more of a model overlay request, a model editing request, a model annotation request, a wall mode request, an inventory analysis request, a model layers request, a first person perspective request, a model degradation analysis request, a model measurement request, and a gas analysis request.

16. The computing apparatus of claim 15 wherein the program instructions further direct the computing apparatus to:
    overlay the one or more multidimensional models onto a base wireframe model when the model analysis request is a model overlay request;
    annotate the one or more multidimensional models with grid points when the model analysis request is a model annotation request;
    identify vertical surfaces of the one or more multidimensional models when the model analysis request is a wall mode request.

17. The computing apparatus of claim 14 wherein the one or more multidimensional models are representative of three-dimensional (3D) models and wherein the 3D models comprise one or more of orthomosaic images, 3D wireframe images, thermal models, landscape models, and architectural models.

18. The computing apparatus of claim 14 wherein the computing apparatus receives the one or more multidimensional models over a unidirectional virtual private network.

19. One or more computer-readable storage media having program instructions stored thereon to process multidimensional models generated based on image data captured by an unmanned aerial vehicle (UAV) during a UAV flight sequence, wherein the program instructions, when executed by a computing system, direct the computing system to at least:
- receive one or more multidimensional models of an environment from a model generation platform;
- receive user input comprising a model analysis request for the one or more multidimensional models;
- execute a model analysis of the one or more multidimensional models based on the model analysis request; and
- enable display of results of the model analysis for access by an end user.

20. The one or more computer-readable storage media of claim 19 wherein the model analysis request comprises one or more of a model overlay request, a model annotation request, and a wall mode request, and wherein the program instructions further direct the computing system to at least:
- overlay the one or more multidimensional models onto a base wireframe model when the model analysis request is a model overlay request;
- annotate the one or more multidimensional models with grid points when the model analysis request is a model annotation request;
- identify vertical surfaces of the one or more multidimensional models when the model analysis request is a wall mode request.

* * * * *